(12) United States Patent
Saijo

(10) Patent No.: US 8,724,028 B1
(45) Date of Patent: May 13, 2014

(54) ELECTRONIC DEVICE AND DISPLAY CONTROL METHOD

(71) Applicant: Kabushiki Kaisha Toshiba, Tokyo (JP)

(72) Inventor: Miki Saijo, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/013,878

(22) Filed: Aug. 29, 2013

Related U.S. Application Data

(63) Continuation of application No. PCT/JP2013/058620, filed on Mar. 25, 2013.

(30) Foreign Application Priority Data

Dec. 20, 2012 (JP) ................................. 2012-277719

(51) Int. Cl.
*H04N 5/445* (2011.01)
*H04N 5/45* (2011.01)
*H04N 9/74* (2006.01)
*H04N 21/431* (2011.01)
*H04N 5/265* (2006.01)
*H04N 5/262* (2006.01)

(52) U.S. Cl.
CPC ............. *H04N 5/44513* (2013.01); *H04N 5/45* (2013.01); *H04N 21/4316* (2013.01); *H04N 5/265* (2013.01); *H04N 5/2624* (2013.01)
USPC ............ 348/564; 348/565; 348/588; 348/598

(58) Field of Classification Search
CPC .......... H04N 5/44513; H04N 5/44543; H04N 5/44504; H04N 5/45; H04N 5/44591; H04N 5/445; H04N 9/74; H04N 9/76; H04N 5/265; H04N 5/272; H04N 5/2624; H04N 9/641; H04N 21/4316; H04N 21/47; G09G 2340/125; G09G 2340/10; G09G 5/14; G09G 2340/12
USPC ................. 348/563–565, 569, 584, 588, 589, 348/598–600; 345/629, 630, 634, 635, 638
IPC .................... H04N 5/445, 5/45, 5/50, 9/74, 9/76
See application file for complete search history.

(56) References Cited

U.S. PATENT DOCUMENTS

| 7,206,029 B2 | 4/2007 | Cohen-Solal | |
|---|---|---|---|
| 7,375,769 B2* | 5/2008 | Yui | 348/584 |
| 2011/0102677 A1* | 5/2011 | Kanda | 348/563 |
| 2011/0181783 A1* | 7/2011 | Kudo | 348/581 |

FOREIGN PATENT DOCUMENTS

| JP | 2001-238176 A | 8/2001 |
|---|---|---|
| JP | 2004-516722 A | 6/2004 |
| JP | 2006-033691 A | 2/2006 |

* cited by examiner

*Primary Examiner* — Sherrie Hsia
(74) *Attorney, Agent, or Firm* — Knobbe, Martens, Olson & Bear, LLP

(57) ABSTRACT

To improve visibility of video input from different sources, a broadcast subframe for receiving a broadcast program or the like to reproduce the same is arranged on a display screen such that the broadcast subframe is not overlapped with a browser subframe for reproducing the movie of e.g., streaming of the browser.

18 Claims, 10 Drawing Sheets

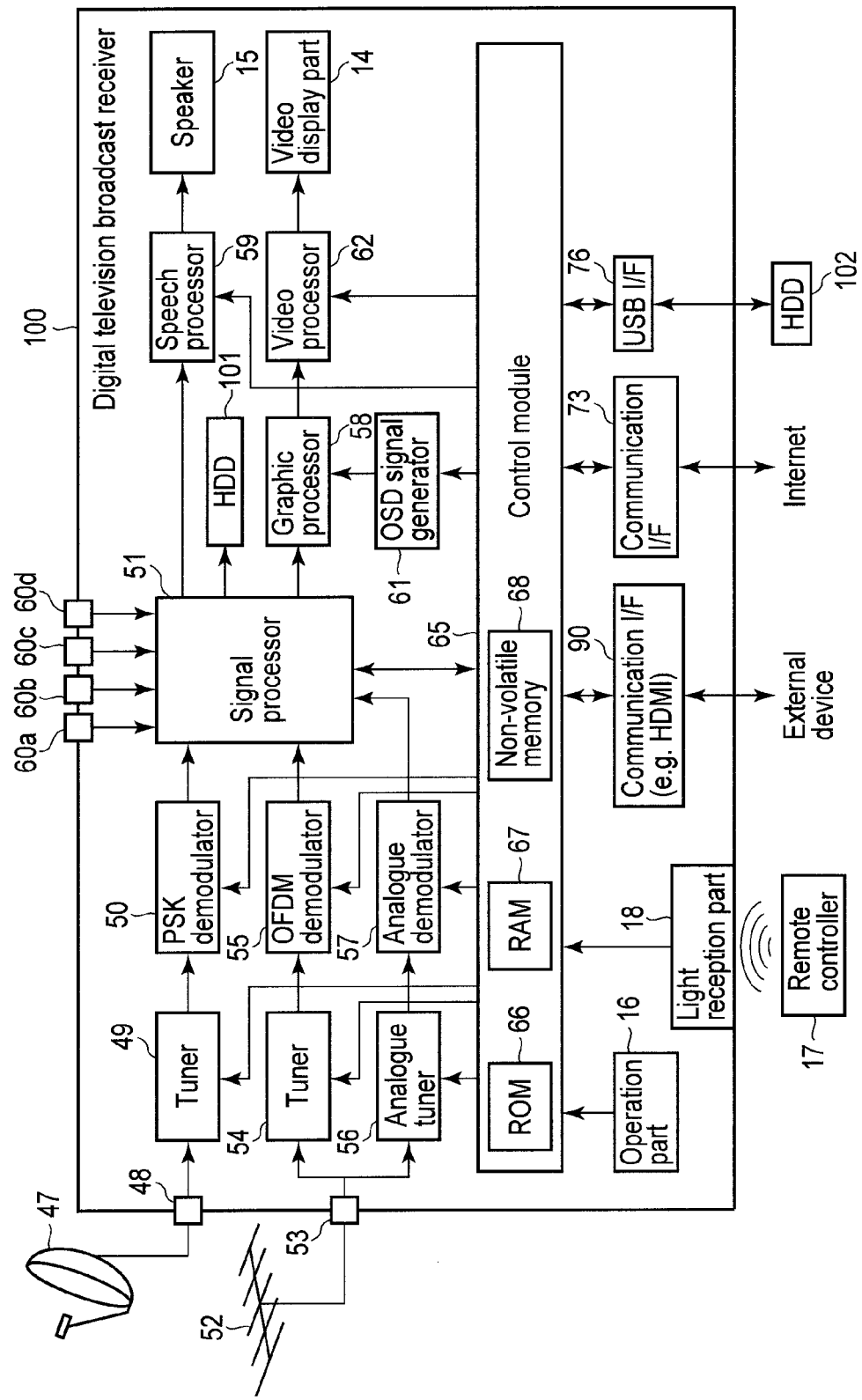
F I G. 1

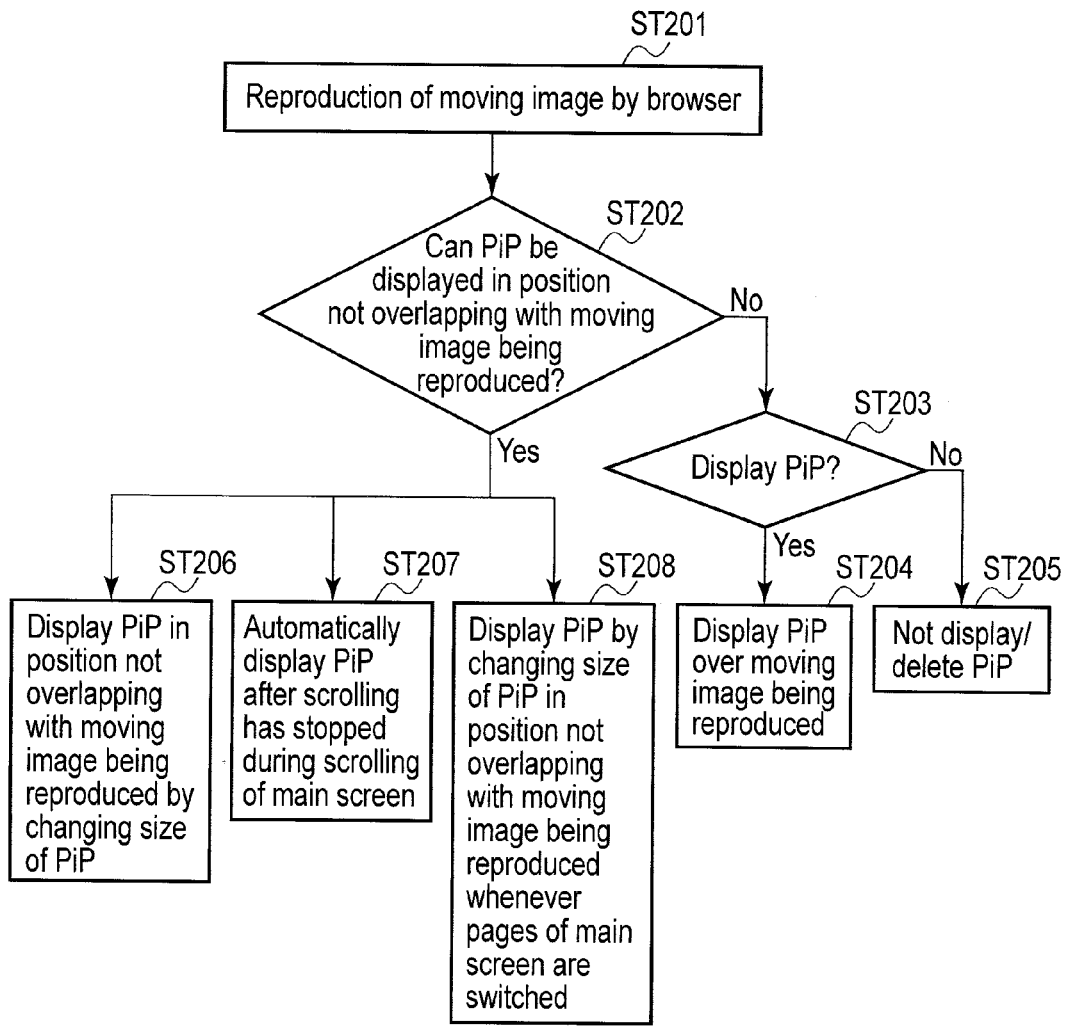
F I G. 2

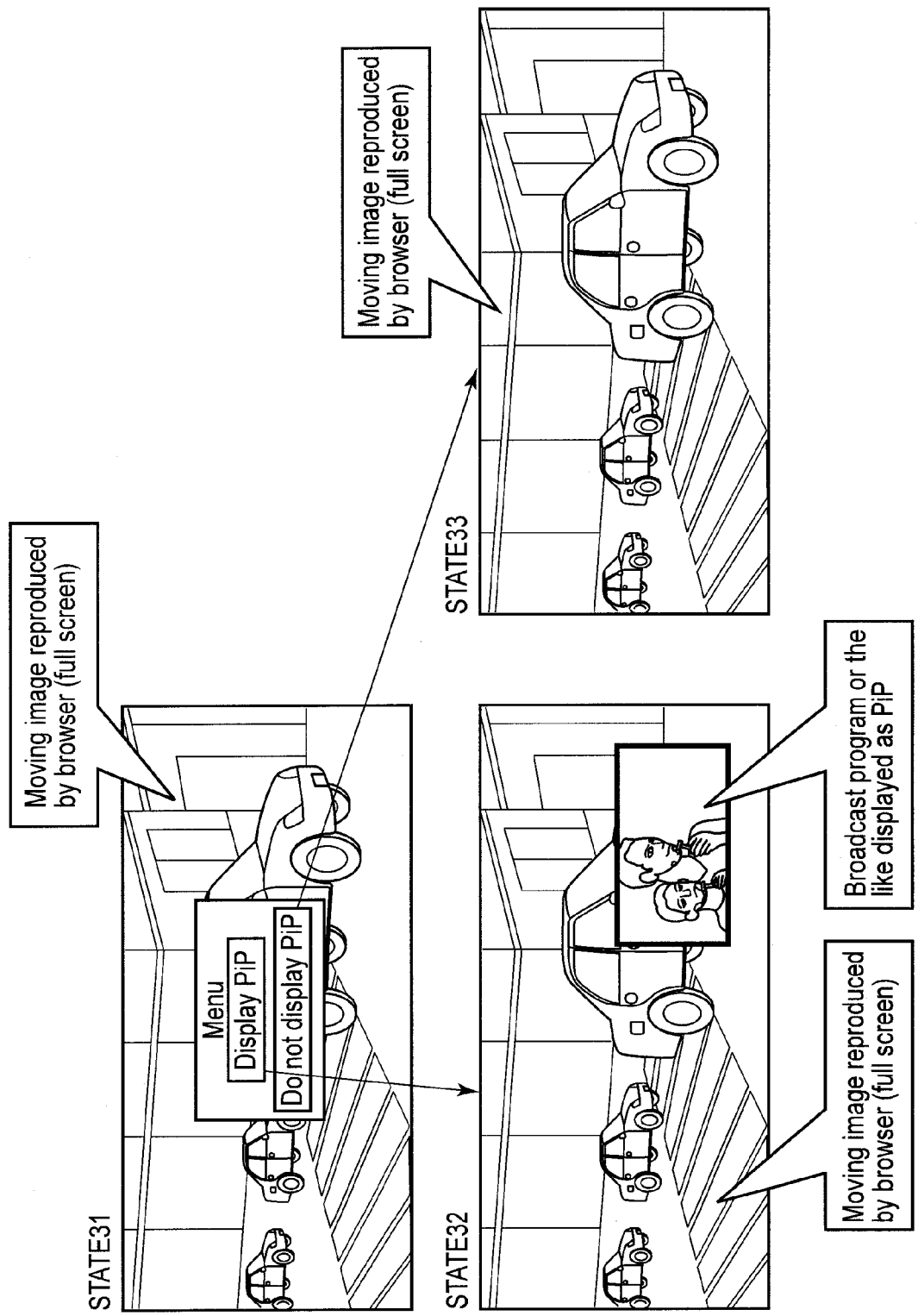
F I G. 3

ELECTRONIC DEVICE AND DISPLAY CONTROL METHOD

CROSS-REFERENCE TO RELATED APPLICATIONS

This application is a Continuation Application of PCT Application No. PCT/JP2013/058620, filed Mar. 25, 2013 and based upon and claiming the benefit of priority from Japanese Patent Application No. 2012-277719, filed Dec. 20, 2012, the entire contents of all of which are incorporated herein by reference.

FIELD

Embodiments described herein relate generally to an electronic device and a display control method.

BACKGROUND

In recent years, digital television (TV) sets have been increasingly common. Digital TV sets are capable of receiving broadcast signals and reproducing and recording programs on the basis of the received broadcast signals. Further, digital TV sets comprise network connector and a browser, and are capable of displaying information obtained via the Internet. As well as digital TV sets, personal computers and the like are similarly capable of recording and reproducing programs on the basis of broadcast signals and displaying information obtained via the Internet.

For example, a technique has been proposed to display information obtained via the Internet on a screen for reproducing a program on the basis of a broadcast signal. That is, a technique has been proposed to display information obtained via the Internet in a small screen over a part of a screen for reproducing a program.

Since information obtained via the Internet often includes character information, it is sometimes difficult to view such character information or the like displayed on a small screen. It becomes easier to view character information or the like displayed on the small screen by increasing the size of the small screen displayed on a part of the screen for reproducing a program, but this in turn makes it difficult to view the screen for reproducing the program.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram illustrating a schematic configuration of a digital television broadcast receiver (electronic device) according to first to third embodiments.

FIG. 2 is an exemplary flowchart illustrating display control according to the first embodiment.

FIG. 3 is an exemplary diagram illustrating a shift of screens according to the first embodiment.

DETAILED DESCRIPTION

Figure 4:
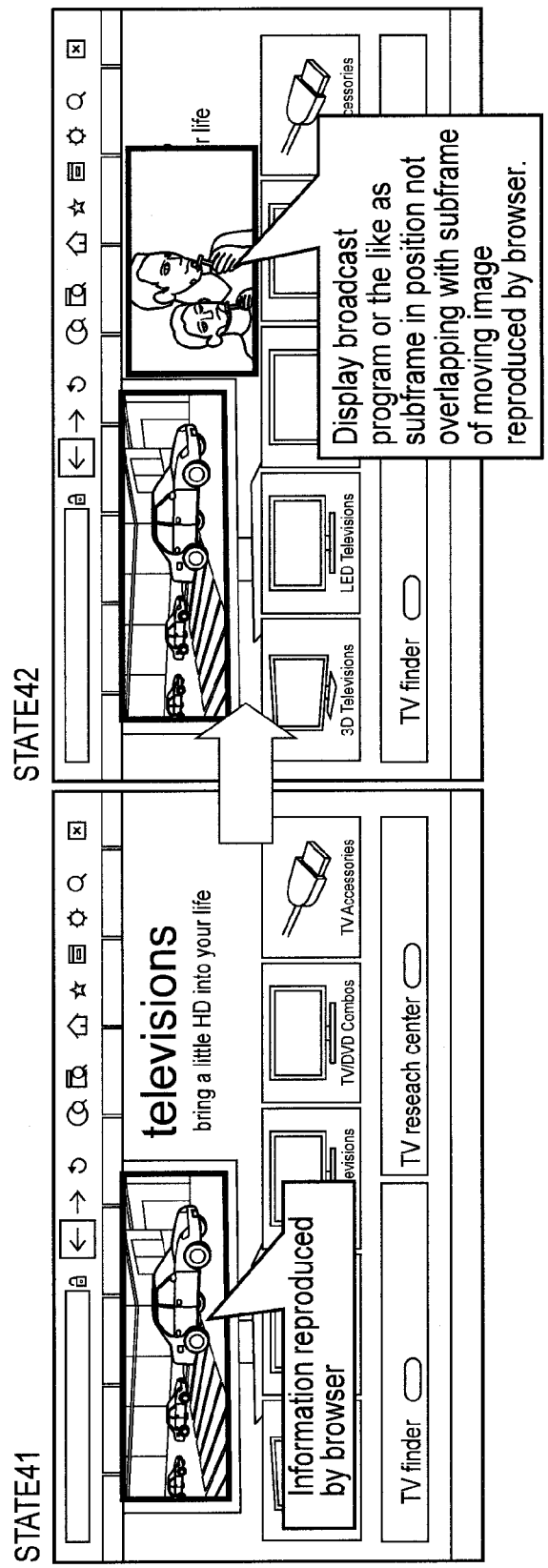
FIG. 4 is an exemplary diagram illustrating a shift of screens according to the first embodiment.

Disclosed are an electronic device and a display control method capable of improving visibility of video input from different sources.

In general, according to one embodiment, an electronic device includes: a first receiver, a second receiver, a generator, and an output module. The first receiver receives first information and moving image data. The second receiver receives second information. The generator generates a first frame on the basis of the first information, generates a moving image frame on the basis of the moving image data, generates a second frame formed of the first frame including the moving image frame, generates a third frame on the basis of the second information such that the third frame is arranged in a region different from that of the moving image frame, and generates a fourth frame including the moving image frame and the third frame. The output module selectively outputs first video display information for displaying the second frame and second video display information for displaying the fourth frame.

Hereinafter, the first to third embodiments will be described in detail with reference to the accompanying drawings.

FIG. 1 is an exemplary diagram illustrating a schematic configuration of a digital television broadcast receiver (electronic device) according to the first to third embodiments. The digital television broadcast receiver shown in FIG. 1 is an example of hardware common to the first to third embodiments. In the present embodiment, an electronic device comprising a video display part 14 will be described, but the video display part 14 is not a required component. For example, when the electronic device is a digital recorder, a main body of a computer, or the like, the electronic device does not comprise a video display part 14, and outputs display information to an external video display part via a cable of a certain kind, for example.

A digital television broadcast receiver 100 will now be described with reference to FIG. 1. As shown in FIG. 1, a digital satellite television broadcast signal received via a BS/CS digital broadcast receiving antenna 47 is supplied to a digital satellite broadcast tuner 49 via an input terminal 48, and the tuner 49 then selects a broadcast signal of a specified channel.

The broadcast signal selected by the tuner 49 is supplied to a phase-shift keying (PSK) demodulator 50, is demodulated into a digital video signal and a digital speech signal, and then output to a signal processor 51.

A digital terrestrial television broadcast signal received via a terrestrial broadcast receiving antenna 52 is supplied to a digital terrestrial broadcast tuner 54 via an input terminal 53, and the tuner 54 then selects a broadcast signal of a specified channel.

The broadcast signal selected by the tuner 54 is supplied to an orthogonal frequency-division multiplexing (OFDM) demodulator 55, is demodulated into a digital video signal and a digital speech signal, and then output to the signal processor 51.

An analogue terrestrial television broadcast signal received via the terrestrial broadcast receiving antenna 52 is supplied to an analogue terrestrial broadcast tuner 56 via the input terminal 53, and the tuner 56 then selects a broadcast signal of a specified channel. The broadcast signal selected by the tuner 56 is supplied to an analogue demodulator 57, is demodulated into an analogue video signal and an analogue speech signal, and then output to the signal processor 51.

The signal processor 51 selectively performs a predetermined digital signal process on the digital video signal and the digital speech signal supplied from each of the PSK demodulator 50 and the OFDM demodulator 55, and then outputs the processed signals to a graphic processor 58 and a speech processor 59.

A plurality of (4 in the case of FIG. 1) input terminals 60a, 60b, 60c, and 60d are connected to the signal processor 51. Each of the input terminals 60a-60d allows an analogue video signal and an analogue speech signal to be input from outside the digital television broadcast receiver 100.

The signal processor 51 selectively digitizes the analogue video signal and speech signal supplied from each of the analogue demodulator 57 and the input terminals 60a-60d, performs a predetermined digital signal process on the digitized video signal and speech signal, and then outputs the processed signals to the graphic processor 58 and the speech processor 59.

The graphic processor 58 has a function of superimposing an on-screen display (OSD) signal generated by an OSD signal generator 61 on the digital video signal supplied from the signal processor 51, and outputting the superimposed signal. The graphic processor 58 is capable of selectively outputting the video signal output from the signal processor 51 and the OSD signal output from the OSD signal generator 61, and outputting a combination of the both outputs.

The digital video signal output from the graphic processor 58 is supplied to a video processor 62. The video signal processed by the video processor 62 is supplied to a video display part 14 and to an output terminal. The video display part 14 displays video on the basis of the video signal, and when an external device is connected to the output terminal, the video signal supplied to the output terminal is input to the external device.

After converting the input digital speech signal into an analogue speech signal that can be reproduced by the speaker 15, the speech processor 59 outputs the converted signal to the speaker 15 so as to be output as speech and to the outside via an output terminal.

A control module 65 of the digital television broadcast receiver 100 collectively controls all the processes and operations including the above-described signal process and the like. The control module 65 is formed of a central processing unit (CPU), for example. The control module 65 controls each element such that the content of operation is reflected on the basis of operation information from an operation part 16 or operation information (code) transmitted from the remote controller 17 and received via a light reception part 18.

In this case, the control module 65 mainly uses a read-only memory (ROM) 66 configured to store a control program that is executed by the CPU, a random access memory (RAM) 67 which provides the CPU with a work area, and a non-volatile memory 68 which stores a variety of types of setting information, control information, and the like.

The control module 65 is capable of transmitting and receiving information via a communication I/F 73. Further, the control module 65 is capable of transmitting information to a USB-compatible device (such as an external HDD 102) via a USB I/F 76.

Further, the control module 65 controls an operation of recording a content (program) on the basis of a reception signal by referring to recording reservation information included in a recording reservation list stored in the non-volatile memory 68. Examples of recording destinations include a built-in HDD 101, an external HDD 102 connected via a USB terminal 24, a hard disc recorder connected via an HDMI terminal, a DVD recorder, and a Blu-ray (R) recorder.

The control module 65, the signal processor 51, the graphic processor 58, the video processor 62, and a program (browser) stored in the non-volatile memory 68 (hereinafter referred to as the control module 65 and its associate) cooperatively generate a frame on the basis of reception data of various kinds, and output video display information for displaying video corresponding to a generated frame.

For example, the control module 65 and its associate are capable of communicating with an external device (such as an external Internet server) via the communication I/F 73, specifying a first address (URL) for the external device, receiving first external data corresponding to the first address from the external device, generating a main frame (first frame) which displays information included in the first external data, and outputting first video display information for displaying the main frame. In response thereto, the video display part 14 displays video corresponding to the main frame (first frame).

Further, in response to an operation of selecting a second address (URL) displayed on the main frame or the like, the control module 65 and its associate are capable of specifying the selected second address (URL) for the external device, receiving second external data corresponding to the second address from the external device, and outputting second video display information for displaying a main frame (modified frame) which displays information included in the second external data. That is, the second video display information is output in place of the first video display information. In response thereto, the video display part 14 displays video corresponding to the main frame (modified frame).

Further, the control module 65 and its associate control output (display) of video display information for displaying a main frame including subframes (small screens) of various kinds. Such subframes are also called picture-in-picture (PiP). Examples of such subframes include a frame that displays video of a broadcast signal received via the tuners 49, 54, 56, etc. Examples of such subframes further include a frame that displays video of moving image data (streaming data) received via the communication I/F 73.

For example, the control module 65 and its associate are capable of generating a first subframe which displays video of moving image data, generating a second subframe which displays video of a broadcast signal, configuring a main frame including the first subframe, outputting video display information for displaying video corresponding to the main frame including the first subframe, configuring a main frame including the first and second subframes, and outputting video display information for displaying video corresponding to the main frame including the first and second subframes. Further, the control module 65 is capable of outputting the first subframe as a main frame, and outputting the second subframe as a main frame.

Hereinafter, a detailed description will be given on the first to third embodiments.

First Embodiment

FIG. 2 is an exemplary flowchart illustrating display control according to the first embodiment.

A case is assumed where the control module 65 and its associate are reproducing a moving image on a browser (ST201). That is, a case is assumed where the control module 65 and its associate generate a first main frame on the basis of external data received the communication I/F 73, generate a first subframe on the basis of moving image data received via the communication I/F 73, configure a second main frame including the first subframe, and output first video display information for displaying video corresponding to the second main frame. That is, a case is assumed where video corresponding to a second main frame including a first subframe corresponding to streaming reproduction data (moving image) is displayed (ST201).

When the control module 65 and its associate display video of a broadcast program or the like as PiP during reproduction of a moving image by a browser (during output of the second main frame), if there is not an available region that does not overlap with the first subframe in the second mainframe, since PiP cannot be displayed in a position that does not overlap with the first subframe (No in ST202), the control module 65 and its associate request the user to select a display mode. For example, the control module 65 and its associate request the user to select a display mode by means of pop-up.

For example, as shown in STATE31 of FIG. 3, when a moving image (first subframe) reproduced by the browser is displayed on the full screen, that is, when the first subframe is displayed as a main frame, there is not an available region that does not overlap with the moving image (first subframe). In such a case, the user is requested to make selection as to whether to display PiP or not by means of pop-up.

If the user has selected to display PiP via the remote controller 17 or the like as input means (YES in ST203), the control module 65 and its associate display video of a broadcast program or the like (second subframe) as PiP on the full screen of the moving image reproduced by the browser, as shown in STATE32 of FIG. 3 (ST204). If the user has selected not to display PiP via the remote controller 17 or the like as input means (NO in ST203), the control module 65 and its associate continue reproduction of the moving image by the browser and do not display video of the broadcast program as PiP, as shown in STATE33 of FIG. 3 (ST205).

When the control module 65 and its associate display video of the broadcast program (second subframe) as PiP during reproduction of the moving image by the browser (during output of the second main frame), if there is an available region that does not overlap with the first subframe and the video of the broadcast program can be displayed as PiP in a position that does not overlap with the first subframe (YES in ST202), the video of the broadcast program is displayed as PiP in the available region (ST206).

For example, as shown in STATE 41 of FIG. 4, if there is an available region that does not overlap with the frame for reproduction of the moving image by the browser during reproduction of the moving image by the browser (during output of the second main frame), the control module 65 and its associate arrange the video of the broadcast program (second subframe) in the available region (such that the first subframe and the second subframe are arranged in different regions), and output (display) video display information for displaying video corresponding to a third main frame including the first subframe and the second subframe, as shown in STATE42 of FIG. 4. In response thereto, the video display part 14 displays video corresponding to the second main frame.

The control module 65 and its associate change the size of the second subframe (video of the broadcast program) such that the second subframe does not overlap with the first subframe (moving image), and output (display) video display information for displaying video corresponding to a third main frame including the first subframe and the second subframe. For example, the control module 65 and its associate adjust (change) the size of the first subframe and the second subframe such that the first subframe and the second subframe are arranged outside a region for displaying characters.

Further, in response to an operation input to the third main frame via the remote controller 17 or the like as input means, the control module 65 and its associate generate a modified frame obtained by modifying the third main frame, and output (display) video display information for displaying video corresponding to the modified frame. In this case, the control module 65 and its associate rearrange the first subframe and the second subframe in different regions in the modified frame. That is, the control module 65 and its associate rearrange the first subframe and the second subframe in the modified frame such that the first subframe and the second subframe do not overlap with each other.

The input to the third main frame can be made by a scrolling operation on the screen, a swiping operation (operation of scrolling the screen by moving a finger both sideways and up and down with the finger touching the screen), a flicking operation (operation of scrolling the screen by moving a finger touching the screen both sideways and up and down and then taking the finger off of the screen), and selection of access information (address) to another web site displayed on the screen. For example, the first and second frames may be displayed in the modified frame at timing after a scrolling operation input has been finished (ST207). In this case, the size of the first frame may be changed before the first frame is displayed, or the size of the second frame may be changed before the second frame is displayed, according to the size of the available region. Further, the first and second frames may be displayed in the modified frame after the modified frame is displayed on the basis of access information to another web site (ST208). In this case, the size of the first frame may be changed before the first frame is displayed, or the size of the second frame may be changed before the second frame is displayed, according to the size of the available region.

With the above-described configuration, it is possible for the user to view video of a broadcast program or the like that is on the air as PiP, while viewing a moving image reproduced by the browser, thereby improving convenience. While a case has been described above where video corresponding to a broadcast program is output (displayed) in a subframe, the video corresponding to the broadcast program may be replaced with video corresponding to an input by a PVR or other external inputs.

A summary of the first embodiment will be given below.

(1) When a first subframe corresponding to streaming reproduction and a second subframe corresponding to video of a certain kind are displayed (as PiP) in a main frame (on the screen for reproduction by the browser), the digital television broadcast receiver 100 arranges the second subframe such that the second subframe does not overlap with the first subframe, and outputs (displays) a main frame including the first and second subframes.

(2) The digital television broadcast receiver 100 automatically changes the size of the first subframe and the second subframe. For example, the digital television broadcast receiver 100 adjusts (changes) the size of the second subframe according to the size of the available region.

(3) The digital television broadcast receiver 100 outputs (displays) the main frame including the first and second subframes, by rearranging the first subframe and the second subframe such that the first subframe and the second subframe do not overlap with each other, by changing the size of the first subframe such that the first subframe and the second subframe do not overlap with each other, or by changing the size of the second subframe such that the first subframe and the second subframe do not overlap with each other, for example, in response to an operation of selecting another URL (an operation of jumping to another link) or a scrolling operation by the user.

(4) When there is not an available region in the main frame (on the screen for reproduction by the browser), for example, and when the first subframe is displayed on the full screen, the digital television broadcast receiver 100 requests the user to input a display mode and displays video in the input display mode. For example, when a display mode that displays a second subframe in a first subframe is specified, a first subframe including a second subframe is displayed as a main frame. When a display mode that does not display a second subframe is specified, a first subframe that does not include a second subframe is displayed as a main frame.

Second Embodiment

A case is assumed where the control module 65 and its associate reproduce information on the browser. That is, a case is assumed where the control module 65 and its associate generate a first frame on the basis of external data received via the communication I/F 73, and output first video display information for displaying video corresponding to the first frame by using the first frame as a main frame. In this case, when an input by an external cause is detected, the control module 65 and its associate control display of a second frame corresponding to the input.

Figure 5:
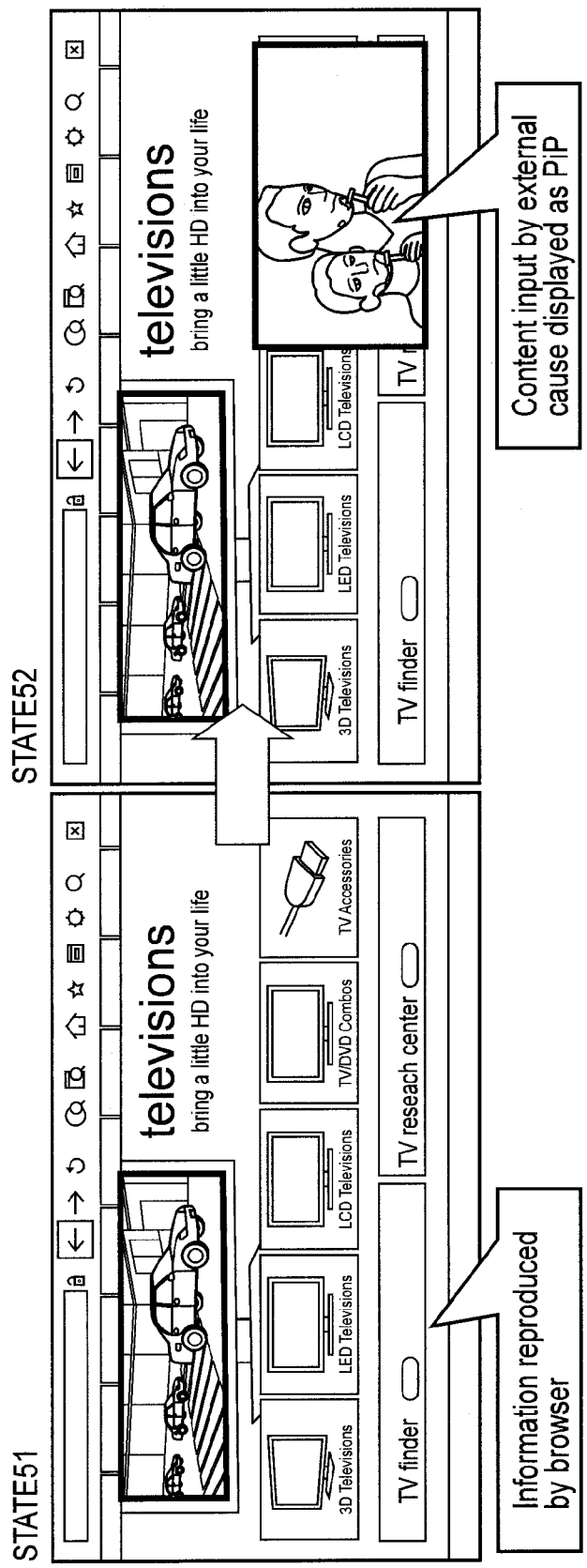
FIG. 5 is an exemplary diagram illustrating a shift of screens according to the second embodiment.

For example, when the control module 65 and its associate detect an input by an external cause during reproduction of information by the browser (during output of the first frame), as shown in STATE51 of FIG. 5, the control module 65 and its associate generate a second frame corresponding to the input by an external cause, generate a third frame which includes the first frame including the second frame, and output second video display information for displaying video corresponding to the third main frame, as shown in STATE52 of FIG. 5. That is, the control module 65 and its associate switch from display of video corresponding to the first frame shown in STATE51 of FIG. 5 to display of video corresponding to the third frame shown in STATE52 of FIG. 5.

Figure 6:
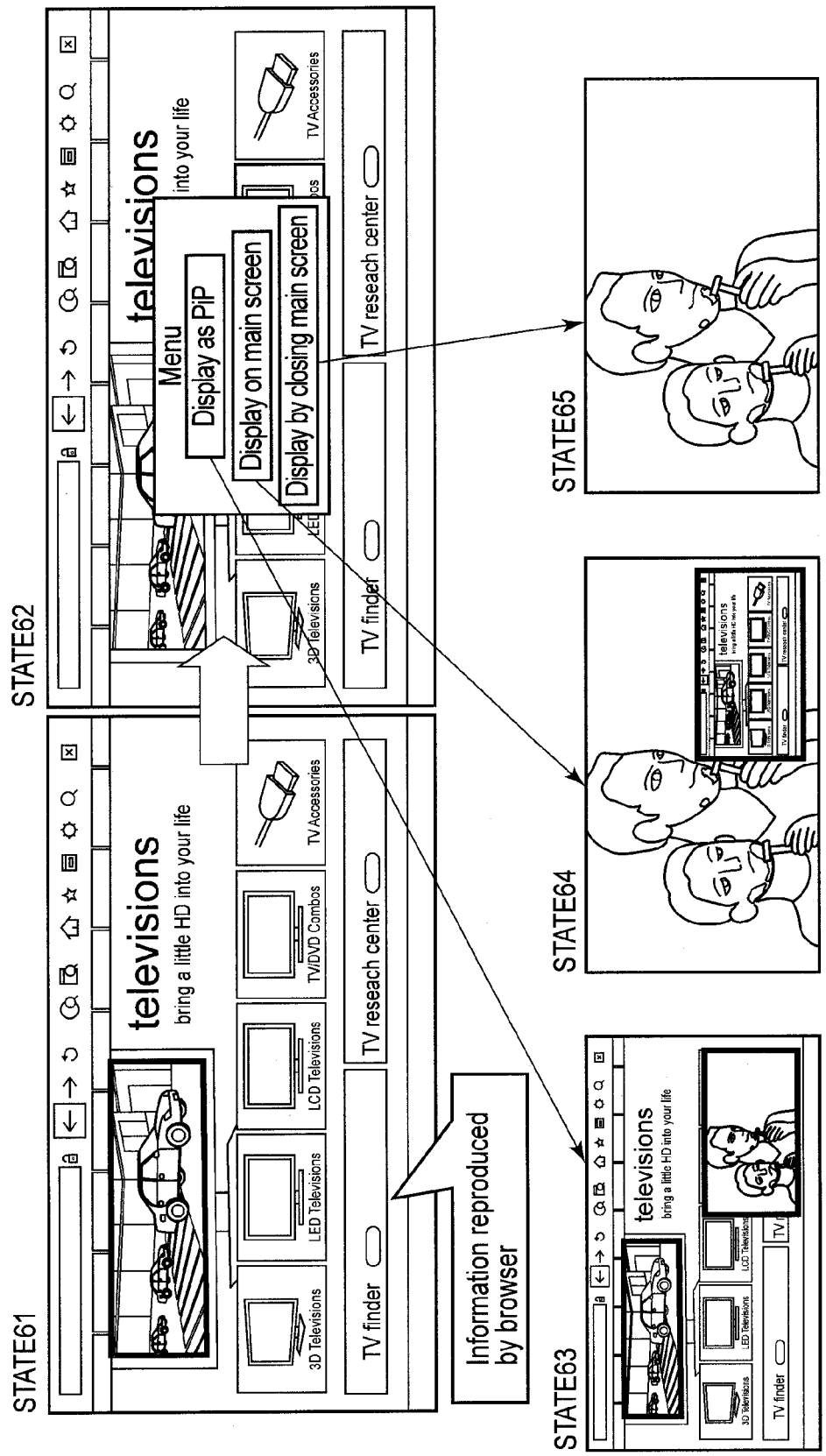
FIG. 6 is an exemplary diagram illustrating a shift of screens according to the second embodiment.

Alternatively, as shown in STATE61 of FIG. 6, when the control module 65 and its associate detect an input by an external cause during reproduction of information by the browser (during output of the first main frame), the control module 65 and its associate output (display) a selection menu, as shown in STATE62 of FIG. 6. The selection menu includes, for example, a first item that specifies providing display as PiP, a second item that specifies providing display on the main screen, and a third item that specifies providing display by closing the main screen.

For example, when the user selects the first item via the remote controller 17 or the like as input means, the control module 65 and its associate generate a second frame corresponding to an input by an external cause, generate a third frame which includes the first frame including the second frame, and output second video display information for displaying video corresponding to the third main frame, as shown in STATE63 of FIG. 6. That is, the control module 65 and its associate display the second frame corresponding to an input by an external cause as PiP.

Further, when the user selects the second item via the remote controller 17 or the like as input means, the control module 65 and its associate generate a first frame corresponding to the browser, generate a second frame corresponding to an input by an external cause, generate a fourth frame that includes the second frame including the first frame, and output third video display information for displaying video corresponding to the fourth frame, as shown in STATE64 of FIG. 6. That is, the control module 65 and its associate display video corresponding to the browser as PiP. In other words, the control module 65 and its associate output (display) the main frame and the subframe by switching the relationship between the main frame and the subframe.

Further, when the user selects the third item via the remote controller 17 or the like as input means, the control module 65 and its associate generate a second frame corresponding to an input by an external cause, and output fourth video display information for displaying video corresponding to the second frame, as shown in STATE65 of FIG. 6. In other words, the control module 65 and its associate output (display) the second frame by replacing the first frame with the second frame.

An example of the input by an external cause will now be described.

For example, when an HDMI-Consumer Electronics Control (CEC) signal is detected via the communication I/F 90 (such as HDMI), the control module 65 and its associate generate a content frame corresponding to a content input via the communication I/F 90, arrange the content frame in a browser frame corresponding to a browser, and output (display) a browser frame including the content frame. That is, when an external device such as a tuner connected via the communication I/F 90 is powered on, the external device outputs an HDMI-CEC signal corresponding to power-on (One Touch Play), and the control module 65 and its associate detect the HDMI-CEC signal corresponding to power-on, and display a content frame corresponding to a content input via the communication I/F 90 of a certain kind in the main frame (browser frame). Alternatively, the control module 65 and its associate output (display) the browser frame and the content frame by switching the relationship between the browser frame and the content frame. Alternatively, the control module 65 and its associate output (display) the content frame by replacing the browser frame with the content frame.

Further, the control module 65 and its associate generate a content frame corresponding to a content input via the communication I/F 90 (Mobile High-Definition Link (MHL)), arrange the content frame in a browser frame corresponding to the browser, and output (display) the browser frame including the content frame. That is, a content frame corresponding to a content input via the communication I/F 90 of a certain kind is displayed as PiP in the main frame (browser frame) in response to power-on or the like of an external device connected via the communication I/F 90. Alternatively, the control module 65 and its associate output (display) the browser frame and the content frame by switching the relationship between the browser frame and the content frame. Alternatively, the control module 65 and its associate output (display) the content frame by replacing the browser frame with the content frame.

Further, the control module 65 and its associate generate a content frame corresponding to a content (content from a digital media server (DMS)) input via the communication I/F 90 (LAN I/F), arrange the content frame in a browser frame corresponding to the browser, and output (display) the browser frame including the content frame. That is, a content frame corresponding to a content input via the communication I/F 90 of a certain kind is displayed as PiP in the main frame (in the browser frame). Alternatively, the control module 65 and its associate output (display) the browser frame and the content frame by switching the relationship between the browser frame and the content frame. Alternatively, the control module 65 and its associate output (display) the content frame by replacing the browser frame with the content frame.

Further, the control module 65 and its associate generate a content frame corresponding to a content (content from an external device with Wireless Display (WiDi)) input via the communication I/F 90 (wireless LAN I/F), arrange the content frame in a browser frame corresponding to the browser, and output (display) the browser frame including the content frame. That is, a content frame corresponding to a content input via the communication I/F 90 of a certain kind is displayed as PiP in the main frame (in the browser frame). Alternatively, the control module 65 and its associate output (display) the browser frame and the content frame by switching the relationship between the browser frame and the content frame. Alternatively, the control module 65 and its associate output (display) the content frame by replacing the browser frame with the content frame.

The control module 65 and its associate output (display) a browser frame including the content frame to a Wireless Fidelity (Wi-Fi) display via the communication I/F 90 (wireless LAN I/F). Alternatively, the control module 65 and its associate output (display) the browser frame and the content frame to the Wi-Fi display via the communication I/F 90 (wireless LAN I/F), by switching the relationship between the browser frame and the content frame, as described above. Alternatively, the control module 65 and its associate output (display) the content frame to the Wi-Fi display via the communication I/F 90 (wireless LAN I/F) by replacing the browser frame with the content frame.

With the above-described configuration, it is possible for the user to view a screen corresponding to a content input by an external cause while viewing a browser screen (without deleting the browser screen). Further, it is also possible for the user to select a mode for displaying a content input by an external cause, thereby increasing options for display.

A summary of the second embodiment will be given below.

(1) The digital television broadcast receiver 100 is capable of displaying a browser screen as a main screen, and displaying a screen corresponding to a content input by an external cause as a subscreen. That is, the digital television broadcast receiver 100 is capable of displaying a screen of a content input by an external cause as PiP in a main screen as a browser screen.

(2) The digital television broadcast receiver 100 is capable of selecting one of the following: a first display mode which displays a browser screen as a main screen, and a screen corresponding to a content input by an external cause as a subscreen; a second display mode which displays a browser screen as a subscreen and a screen corresponding to a content input by an external cause as a main screen; and a third display mode which displays a screen corresponding to a content input by an external cause as a main screen.

Third Embodiment

A case is assumed where the control module 65 and its associate reproduce information on a browser, and reproduce a broadcast program or the like. That is, the control module 65 and its associate generate a first frame on the basis of external data received via the communication I/F 73, generate a second frame corresponding to a broadcast program or the like, and generate a third frame which includes the first frame including the second frame, thereby outputting (displaying) video display information for displaying video corresponding to the first frame, and outputting (displaying) video display information for displaying video corresponding to the third frame, according to conditions. That is, the control module 65 and its associate control display of a broadcast program or the like as PiP according to conditions.

Figure 7:
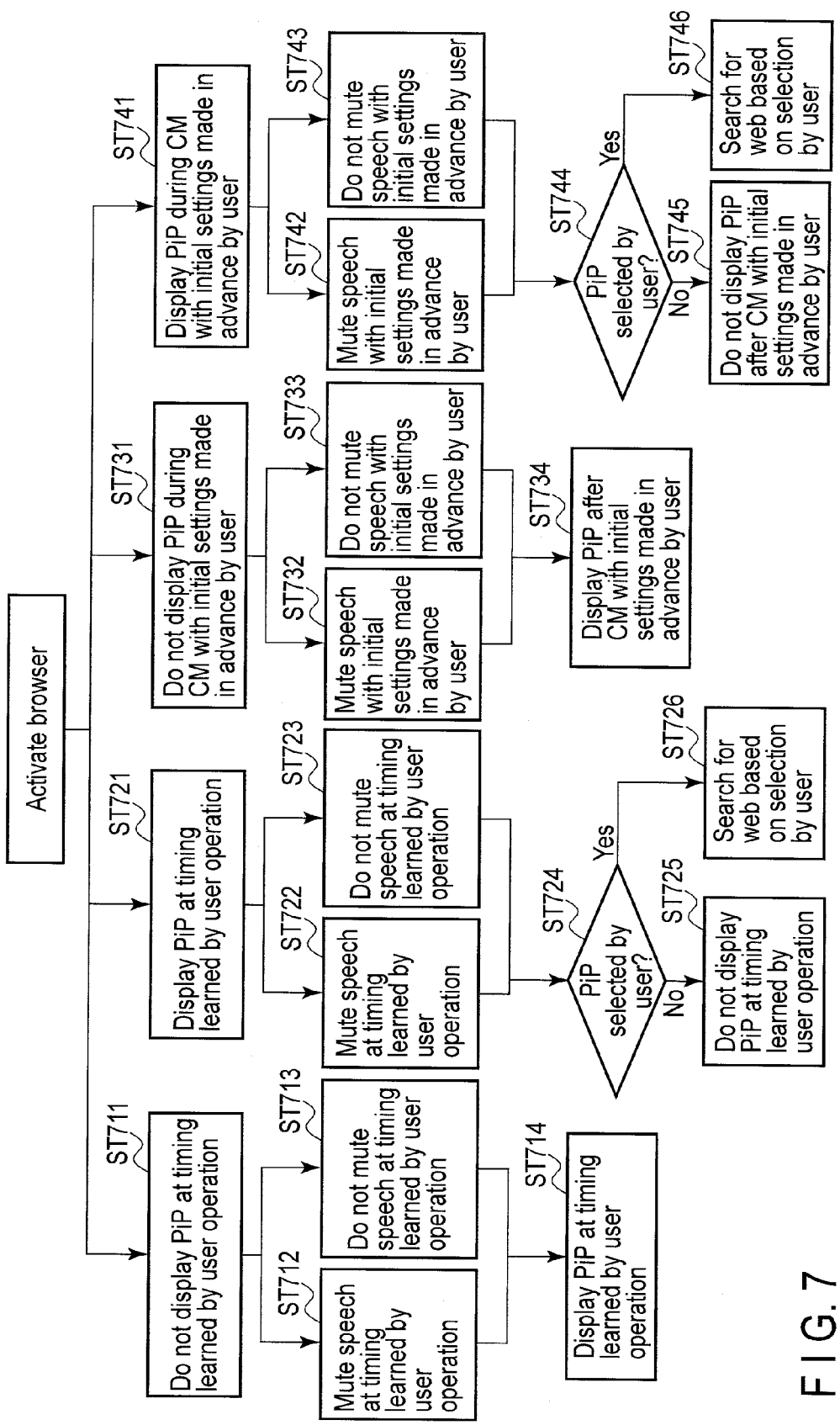
FIG. 7 is an exemplary flowchart illustrating display control according to the second embodiment.

Control in displaying a broadcast program or the like as PiP will be described with reference to the flowchart shown in FIG. 7.

For example, the user is capable of making, via the remote controller 17 or the like as input means, settings to display PiP while the main content is on the air (first condition), not to display PiP while the main content is on the air (second condition), to display PiP while a CM is on the air (third condition), not to display PiP while a CM is on the air (fourth condition), to mute speech corresponding to PiP display while the main content is on the air (fifth condition), not to mute speech corresponding to PiP display while the main content is on the air (sixth condition), to mute speech corresponding to PiP display while a CM is on the air (seventh condition), and not to mute speech corresponding to PiP display while a CM is on the air (eighth condition). The non-volatile memory 68 stores the above-described settings. It is also possible to adopt some of the first to eighth conditions.

Figure 8:
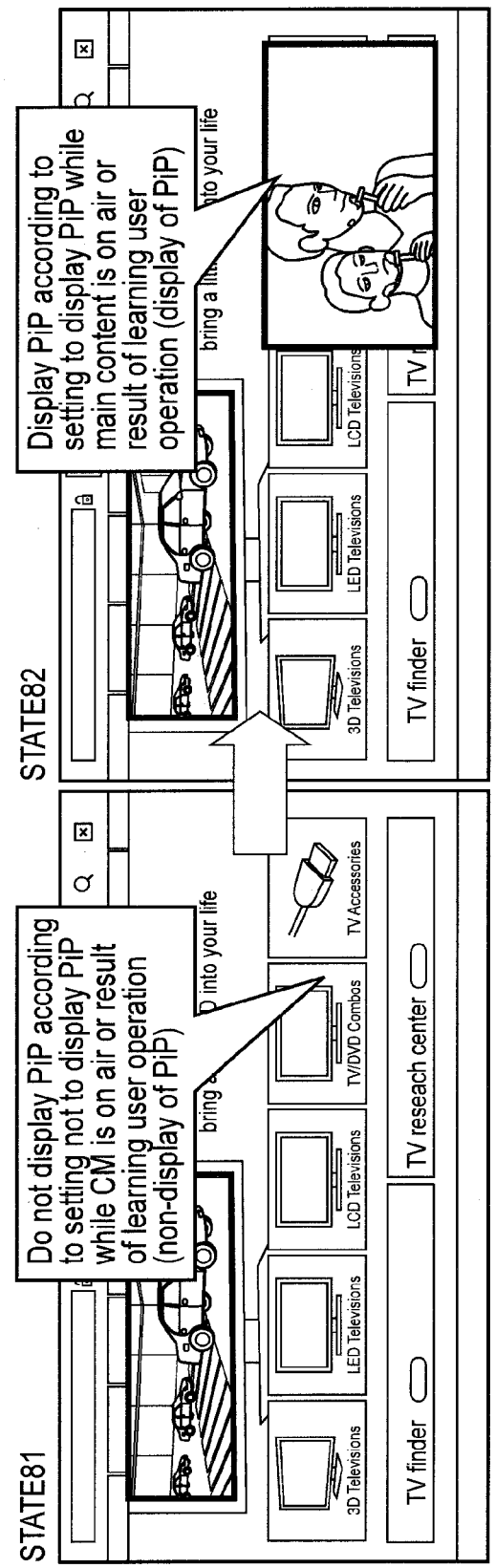
FIG. 8 is an exemplary diagram illustrating a shift of screens according to the third embodiment.

For example, when the first, fourth, sixth, and seventh conditions are set, the control module 65 and its associate output browser video (video display information for displaying video corresponding to the third frame) including PiP display of a broadcast program (main content) during detection of the main content of the broadcast program, and also output speech corresponding to the broadcast program (main content). When a CM of the broadcast program is detected, the control module 65 and its associate output browser video (video display information for displaying video corresponding to the first frame) not including PiP display of the broadcast program (CM) (ST731) (STATE81 of FIG. 8), and stop speech corresponding to the broadcast program (CM) (ST732). When the main content (or end of a CM) of the broadcast program is detected again, the control module 65 and its associate output browser video (video display information for displaying video corresponding to the third frame) including PiP display of the broadcast program (main content) (ST734) (STATE82 of FIG. 8), and also output speech corresponding to the broadcast program (main content).

For example, when the first, fourth, sixth, and eighth conditions are set, the control module 65 and its associate output browser video (video display information for displaying video corresponding to the third frame) including PiP display of the broadcast program (main content) during detection of the main content of the broadcast program, and also output speech corresponding to the broadcast program (main content). When a CM of the broadcast program is detected, the control module 65 and its associate output browser video (video display information for displaying video corresponding to the first frame) not including PiP display of the broadcast program (CM) (ST731), and output speech corresponding to the broadcast program (CM) (ST733). When the main content (or end of a CM) of the broadcast program is detected again, the control module 65 and its associate output browser video (video display information for displaying video corresponding to the third frame) including PiP display of the broadcast program (main content) (ST734), and also output speech corresponding to the broadcast program (main content).

Figure 9:
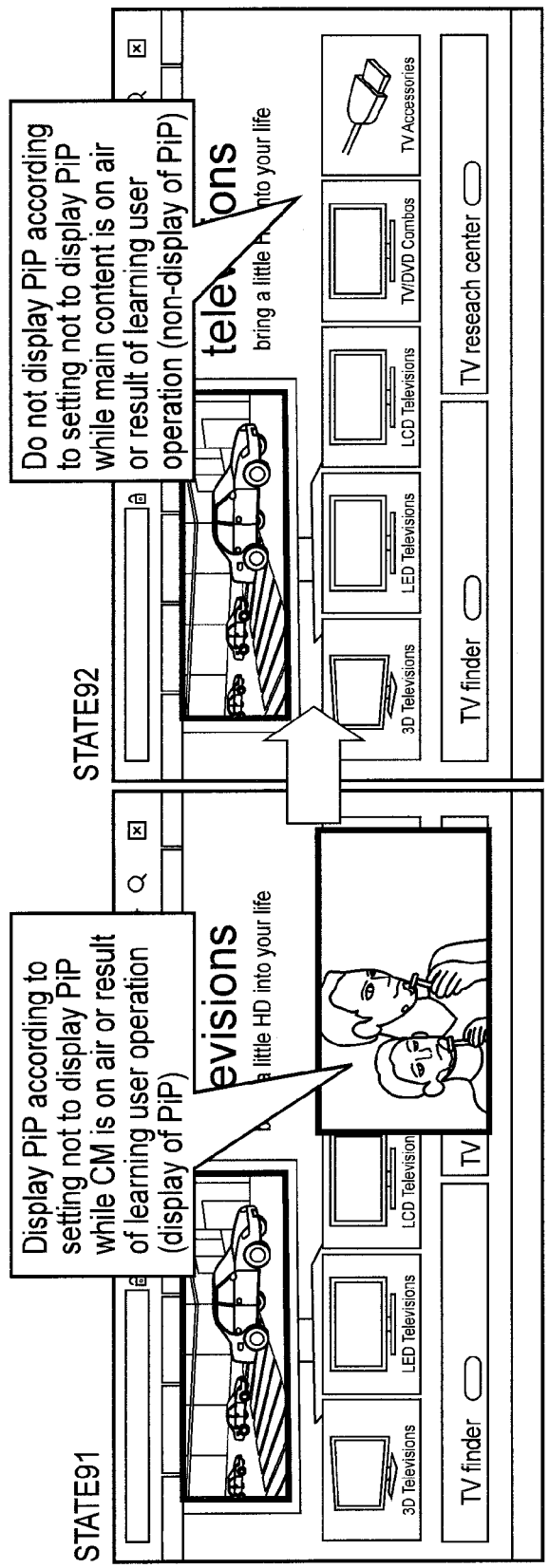
FIG. 9 is an exemplary diagram illustrating a shift of screens according to the third embodiment.

For example, when the second, third, fifth, and seventh conditions are set, the control module 65 and its associate output browser video (video display information for displaying video corresponding to the first frame) not including PiP display of the broadcast program (main content) during detection of the main content of the broadcast program, and do not output speech corresponding to the broadcast program (main content). When a CM of the broadcast program is detected, the control module 65 and its associate output browser video (video display information for displaying video corresponding to the third frame) including PiP display of the broadcast program (CM) (ST741) (STATE91 of FIG. 9), and do not output speech corresponding to the broadcast program (CM) (ST742). When PiP display is not selected via the remote controller 17 or the like (NO in ST744) and when the main content (or end of a CM) of the broadcast program is detected again, the control module 65 and its associate output browser video (video display information for displaying video corresponding to the first frame) not including PiP display of the broadcast program (main content) (ST735) (STATE92 of FIG. 9), and do not output speech corresponding to the broadcast program (main content). When PiP display is selected via the remote controller 17 or the like (YES in ST744), the control module 65 performs a web searching process (ST746). For example, the control module 65 outputs a web search screen, or automatically executes a web search on the basis of information included in the broadcast program and outputs a web search result screen.

For example, when the second, third, fifth, and eighth conditions are set, the control module 65 and its associate output browser video (video display information for displaying video corresponding to the first frame) not including PiP display of a broadcast program (main content) during detection of the main content of the broadcast program, and do not output speech corresponding to the broadcast program (main content). When a CM of the broadcast program is detected, the control module 65 and its associate output browser video (video display information for displaying video corresponding to the third frame) including PiP display of the broadcast program (CM) (ST741), and output speech corresponding to the broadcast program (CM) (STATE743). When PiP display is not selected via the remote controller 17 or the like (NO in ST744) and when the main content (or end of a CM) of the broadcast program is detected again, the control module 65 and its associate output browser video (video display information for displaying video corresponding to the first frame) not including PiP display of the broadcast program (main content) (ST735), and do not output speech corresponding to the broadcast program (main content). When PiP display is selected via the remote controller 17 or the like (YES in ST744), the control module 65 performs a web searching process (ST746). For example, the control module 65 outputs a web search screen, or automatically executes a web search on the basis of information included in the broadcast program and outputs a web search result screen.

Alternatively, the user is capable of making, via the remote controller 17 or the like, settings to display PiP on the basis of a result of learning a user operation (first condition); not to display PiP on the basis of the result of learning the user operation (second condition); to mute speech corresponding to PiP display on the basis of the result of learning the user operation (third condition); and to mute speech corresponding to PiP display on the basis of the result of learning the user operation (fourth condition). For example, when the user selects a variety program via the remote controller 17 or the like and makes a setting not to display PiP, the control module 65 and its associate learn these operations and do not display PiP when a variety program is detected. When the user selects a drama program via the remote controller 17 or the like and makes a setting to display PiP, the control module 65 and its associate learn these operations and display PiP when a drama program is detected. The non-volatile memory 68 stores the above-described settings. It is also possible to adopt some of the first to fourth conditions.

For example, when the second and third conditions are set, the control module 65 and its associate output browser video (video display information for displaying video corresponding to the third frame) including PiP display of the broadcast program during detection of a program other than a variety program, and also output speech corresponding to the broadcast program. When a variety program is detected, the control module 65 and its associate output browser video (video display information for displaying video corresponding to the first frame) not including PiP display of the broadcast program (ST711), and stop speech corresponding to the broadcast program (ST712). When a program other than a variety program is detected again, the control module 65 and its associate output browser video (video display information for displaying video corresponding to the third frame) including PiP display of the broadcast program (ST714), and also output speech corresponding to the broadcast program.

For example, when the second and fourth conditions are set, the control module 65 and its associate output browser video (video display information for displaying video corresponding to the third frame) including PiP display of a broadcast program during detection of a program other than a variety program, and output speech corresponding to the broadcast program. When a variety program is detected, the control module 65 and its associate output browser video (video display information for displaying video corresponding to the first frame) not including PiP display of the broadcast program (ST711), and output speech corresponding to the broadcast program (ST713). When a program other than a variety program is detected again, the control module 65 and its associate output browser video (video display information for displaying video corresponding to the third frame) including PiP display of the broadcast program (ST714), and also output speech corresponding to the broadcast program.

For example, when the first and third conditions are set, the control module 65 and its associate output browser video (video display information for displaying video corresponding to the first frame) not including PiP display of the broadcast program during detection of a program other than a drama program, and do not output speech corresponding to the broadcast program. When a drama program is detected, the control module 65 and its associate output browser video (video display information for displaying video corresponding to the third frame) including PiP display of the broadcast program (ST721), and do not output speech corresponding to the broadcast program (ST722). When PiP display is not selected via the remote controller 17 or the like (NO in ST724) and when a program other than a drama program is detected again, the control module 65 and its associate output browser video (video display information for displaying video corresponding to the first frame) not including PiP display of the broadcast program (ST725), and do not output speech corresponding to the broadcast program. When PiP display is selected via the remote controller 17 or the like (YES in ST724), the control module 65 performs a web searching process (ST726). For example, the control module 65 outputs a web search result screen, or automatically performs a web search on the basis of information included in the broadcast program and outputs a web search screen.

For example, when the first and fourth conditions are set, the control module 65 and its associate output browser video (video display information for displaying video corresponding to the first frame) not including PiP display of the broadcast program during detection of a program other than a drama program, and do not output speech corresponding to the broadcast program. When a drama program is detected, the control module 65 and its associate output browser video (video display information for displaying video corresponding to the third frame) including PiP display of the broadcast program (ST721), and output speech corresponding to the broadcast program (ST723). When PiP display is not selected via the remote controller 17 or the like (NO in ST724) and a program other than a drama program is detected again, the control module 65 and its associate output browser video (video display information for displaying video corresponding to the first frame) not including PiP display of the broadcast program (ST725), and do not output speech corresponding to the broadcast program. When PiP display is selected via the remote controller 17 or the like (YES in ST724), the control module 65 performs a web search process (ST726). For example, the control module 65 outputs a web search screen, or automatically performs a web search on the basis of information included in the broadcast program and outputs a web search result screen.

It is possible to detect switch of speech signals included in broadcast signals using the known technique, and detect start of a CM, end of a CM, start of the main content, end of the main content, and the like on the basis of the detection of switch of speech signals. It is also possible to detect start of a CM, end of a CM, start of the main content, end of the main content, and the like, using other known techniques.

With the above-described configuration, it is possible for the user to view PiP display at appropriate timing. In contrast to a case where PiP display is constantly output and the amount of information on the browser screen decreases, it is possible to view sufficient information on the browser screen while PiP display is not output, since PiP display is output at appropriate timing.

A summary of the third embodiment will be given below.

(1) The digital television broadcast receiver 100 displays a browser screen as a main screen, and displays PiP of a broadcast program or the like as a subscreen in the browser screen at appropriate timing. For example, while the main content is on the air, the digital television broadcast receiver 100 displays video corresponding to the broadcast program as PiP, and does not display video corresponding to the broadcast program while a CM is on the air. That is, the digital television broadcast receiver 100 is capable of switching between display of PiP and non-display of PiP according to switching between the main content and a CM.

(2) The digital television broadcast receiver 100 is capable of outputting speech corresponding to a broadcast program or the like and stopping output of the speech at appropriate timing. For example, the digital television broadcast receiver 100 outputs speech corresponding to a broadcast program while the main content is on the air, and stops outputting speech corresponding to the broadcast program while a CM is on the air. That is, the digital television broadcast receiver 100 switches between output of speech and stop of output of speech, according to switching between the main content and a CM.

(3) The digital television broadcast receiver 100 learns operations by the user to display PiP and not to display PiP intentionally, and switches between display of PiP and non-display of PiP by using the learned result, without operation by the user.

(4) The digital television broadcast receiver 100 learns an operation by the user to output speech corresponding to a broadcast program or stop output of speech intentionally, and switches between output of speech and stop of output of speech, using the learned result, without operation by the user.

(5) The digital television broadcast receiver 100 is capable of executing a web search easily from PiP display.

Figure 10:
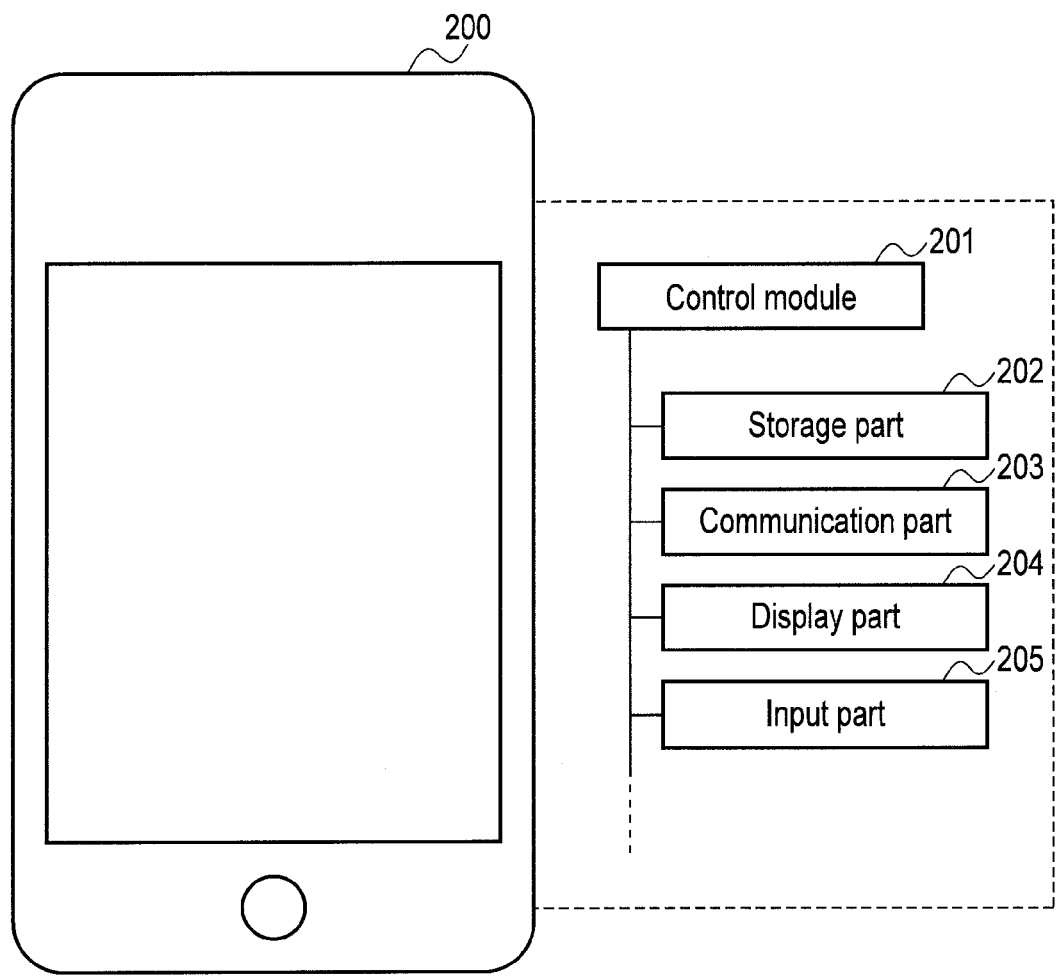
FIG. 10 is an exemplary diagram illustrating a schematic configuration of a communication terminal (electronic device) according to the first to third embodiments.

In the description given above, the digital television broadcast receiver (electronic device) 100 for embodying the first, second, and third embodiments has been described, but may be replaced with a communication terminal (electronic device) shown in FIG. 10. The communication terminal 200 is a tablet terminal PC, a smartphone, or the like.

As shown in FIG. 10, the communication terminal 200 comprises a control module 201, a storage part 202, a communication part 203, a display part 204, and an input part 205. The control module 201 corresponds to the control module 65 and its associate, and controls PiP display, etc. The storage part 202 stores a variety of control programs (browsers). The communication part 203 communicates with an external device (such as an external Internet server) over wireless communications, for example, specifies an address (URL) for the external device, and receives external data corresponding to the address from the external device. The display part 204 generates a main frame which displays information included in the external data, and displays video corresponding to the main frame. Further, the communication part 203 communicates with the digital television broadcast receiver (electronic device) 100 over wireless communications, for example, and receives a content such as a broadcast program. The display part 204 generates a subframe corresponding to the content, and displays the subframe as PiP. That is, the display part 204 displays a main frame including a subframe corresponding to the content. The input part 205 is formed of a touchpanel or the like, corresponding to the display part 204, and receives a touch input on a variety of types of information displayed on the display part 204, for example.

The communication terminal 200 is capable of communicating with an external server or the like, via an access point in a communication area of Wireless Fidelity (Wi-Fi) or the like. That is, the communication terminal 200 cannot communicate with the external server or the like, outside the communication area of Wi-Fi or the like. For example, when the communication part 203 starts (restarts) communicating with an access point in the communication area, the control module 201 instructs the display part 204 to display a message indicating that an open browser is available. In response thereto, the display part 204 displays a message "Open browser available".

A case is assumed where the user who owns the communication terminal 200 is using a browser of the communication terminal 200 in a communication area, for example. If the user is out of the communication area of Wi-Fi or the like by moving therefrom, the browser of the communication terminal 200 cannot be used substantially. Further, if the user who owns the communication terminal 200 moves into the communication area of Wi-Fi or the like, the communication part 203 starts communicating with an access point in the communication area, the control module 201 instructs the display part 204 to display a message indicating that an open browser is available, and the display part 204 displays a message "Open browser available". Thereby, the user is capable of knowing that the browser (open browser) which has been unavailable (temporarily unavailable) has become available (available again).

The above-described module may be embodied either as hardware or as software using a CPU or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a first receiver configured to receive first information and moving image data;
a second receiver configured to receive second information;
a generator configured to generate
a first frame based on the first information,
a moving image frame based on the moving image data,
a second frame formed of the first frame including the moving image frame,
a third frame based on the second information where the third frame is arranged in a region different from a region of the moving image frame, and
a fourth frame including the moving image frame and the third frame; and
an output module configured to output first video display information for displaying the second frame or second video display information for displaying the fourth frame.

2. The electronic device of claim 1, wherein the output module is configured to output the first video display information upon receipt of the first information and the moving image data.

3. The electronic device of claim 1, wherein the output module is configured to output the second video display information upon receipt of the first information, the moving image data, and the second information.

4. The electronic device of claim 1, wherein the output module is configured to
receive the first information and the moving image data,
output the first video display information when the second information is not received, and
output the second video display information by replacing the first video display information with the second video display information when the second information is received during output of the first video display information.

5. The electronic device of claim 1, wherein the generator is configured to arrange the moving image frame and the second frame in separate regions in the fourth frame, the moving image frame and the second frame being unoverlapped with each other.

6. The electronic device of claim 1, wherein the generator is configured to determine a size of the third frame according to a size of a given region in the fourth frame, the given region being unoverlapped with the moving image frame.

7. The electronic device of claim 1, further comprising an input module configured to receive an input to specify a first display mode,
wherein the output module is configured to output fourth video display information in response to the input to specify the first display mode.

8. The electronic device of claim 1, further comprising an input module configured to receive an input to specify a second display mode,
wherein the generator is configured to generate a fifth frame including the moving image frame and the third frame, the moving image frame and the third frame being arranged to at least partially overlap with each other, and
the output module is configured to output fifth video display information in response to the input to specify the second display mode.

9. The electronic device of claim 1, wherein the first receiver is configured to receive the moving image data corresponding to streaming reproduction data.

10. The electronic device of claim 1, wherein
the first receiver is configured to specify an address for an external device, and receive the first information corresponding to the specified address, and
the second receiver is configured to receive the second information corresponding to a broadcast signal.

11. The electronic device of claim 1, further comprising a display configured to display the video display information.

12. An electronic device comprising:
a first receiver configured to receive first information and moving image data;
a second receiver configured to receive second information;
a generator configured to generate a first frame based on the first information, a moving image frame based on the moving image data, a second frame formed of the first frame including the moving image frame, a third frame based on the second information where the third frame is arranged in a region different from a region of the moving image frame, and a fourth frame including the moving image frame and the third frame;
an output module configured to output first video display information for displaying the second frame or second video display information for displaying the fourth frame; and
an input module configured to receive an input, wherein
the generator is responsive to the input for the fourth frame, and is configured to generate a modified frame by modifying the fourth frame, the modified frame including the moving image frame and the third frame, and the third frame being rearranged in a region different from a region of the moving image frame, and
the output module is configured to output third video display information for displaying the modified frame.

13. The electronic device of claim 12, wherein the input module is configured to receive an input corresponding to a scrolling operation, a flicking operation, or a swiping operation.

14. The electronic device of claim 12, wherein
the first receiver is configured to
specify a first address for an external device,
receive the first information corresponding to the specified first address,
specify a second address for the external device, and
receive the third information corresponding to the specified second address, and
the generator is configured to generate the modified frame based on the third information.

15. The electronic device of claim 12, wherein the first receiver is configured to receive the moving image data corresponding to streaming reproduction data.

16. The electronic device of claim 12, wherein
the first receiver is configured to specify an address for an external device, and receive the first information corresponding to the specified address, and
the second receiver is configured to receive the second information corresponding to a broadcast signal.

17. The electronic device of claim 12, further comprising a display configured to display the video display information.

18. A display control method comprising:
receiving first information and moving image data from a first receiver;
generating a first frame based on the first information, a moving image frame based on the moving image data, and a second frame formed of the first frame including the moving image frame;
outputting first video display information for displaying the second frame;
receiving second information from a second receiver;
generating a third frame based on the second information where the third frame is arranged in a region different from a region of the moving image frame, and a fourth frame including the moving image frame and the third frame; and
outputting second video display information for displaying the fourth frame.

* * * * *